United States Patent
Siebigteroth et al.

(10) Patent No.: US 7,086,989 B2
(45) Date of Patent: Aug. 8, 2006

(54) CONTROL METHOD FOR SHIFTING A POWERSHIFT TRANSMISSION

(75) Inventors: Marco Siebigteroth, Hennef (DE); Christian Krauss, Köln (DE)

(73) Assignee: Getrag Ford Transmissions GmbH, Koln (DE)

( * ) Notice: Subject to any disclaimer, the term of this patent is extended or adjusted under 35 U.S.C. 154(b) by 188 days.

(21) Appl. No.: 10/911,303

(22) Filed: Aug. 4, 2004

(65) Prior Publication Data

US 2005/0037893 A1    Feb. 17, 2005

(30) Foreign Application Priority Data

Aug. 14, 2003    (EP) ................... 03102541

(51) Int. Cl.
*B60W 10/04*    (2006.01)

(52) U.S. Cl. .................................... 477/109
(58) Field of Classification Search ........... 477/109; 74/331; 192/87.11, 87.12
See application file for complete search history.

(56) References Cited

U.S. PATENT DOCUMENTS

| | | | | |
|---|---|---|---|---|
| 4,527,678 A | * | 7/1985 | Pierce et al. ............... | 192/3.58 |
| 4,790,418 A | * | 12/1988 | Brown et al. .................. | 701/51 |
| 5,046,383 A | * | 9/1991 | Butts et al. .................. | 477/120 |
| 5,079,970 A | * | 1/1992 | Butts et al. .................. | 477/102 |
| 5,133,227 A | * | 7/1992 | Iwatsuki ..................... | 477/110 |
| 5,669,851 A | * | 9/1997 | Tietze ........................ | 477/109 |
| 5,846,163 A | * | 12/1998 | Kimura et al. ............... | 477/148 |
| 5,950,781 A | * | 9/1999 | Adamis et al. ............. | 192/3.61 |
| 6,080,084 A | * | 6/2000 | Yasue et al. ................. | 477/154 |
| 6,319,172 B1 | * | 11/2001 | Steinmetz et al. ........... | 477/143 |
| 6,364,809 B1 | * | 4/2002 | Cherry ........................ | 477/86 |
| 6,371,879 B1 | | 4/2002 | Takahagi et al. | |
| 6,503,172 B1 | | 1/2003 | Ochi et al. | |
| 6,634,990 B1 | * | 10/2003 | Katou et al. ................. | 477/143 |
| 6,866,612 B1 | * | 3/2005 | Tokura et al. ............... | 477/176 |
| 6,881,171 B1 | * | 4/2005 | Kuhstrebe et al. ............ | 477/78 |
| 6,887,184 B1 | * | 5/2005 | Buchanan et al. ........... | 477/174 |
| 6,949,051 B1 | * | 9/2005 | Katakura ..................... | 477/175 |
| 6,969,340 B1 | * | 11/2005 | Tokura et al. ............... | 477/109 |

FOREIGN PATENT DOCUMENTS

| | | |
|---|---|---|
| DE | 19631983 | 2/1998 |
| DE | 19939334 | 3/2001 |
| EP | 1319873 | 6/2003 |

* cited by examiner

*Primary Examiner*—Dirk Wright
(74) *Attorney, Agent, or Firm*—MacMillan, Sobanski & Todd, LLC

(57) ABSTRACT

In a transmission during a shifting process while torque is transferred from a power-outputting clutch, which is initially in the adhered state, to a power-receiving clutch, which is initially open, the power-receiving clutch increases torque capacity in a slip region, and the power-outputting clutch decreases torque capacity during an initial phase of the transfer of torque while its torque capacity is greater than necessary to maintain its adhered state. In the final state of the transfer of torque, the power-receiving clutch transmits the entire drive torque.

16 Claims, 7 Drawing Sheets

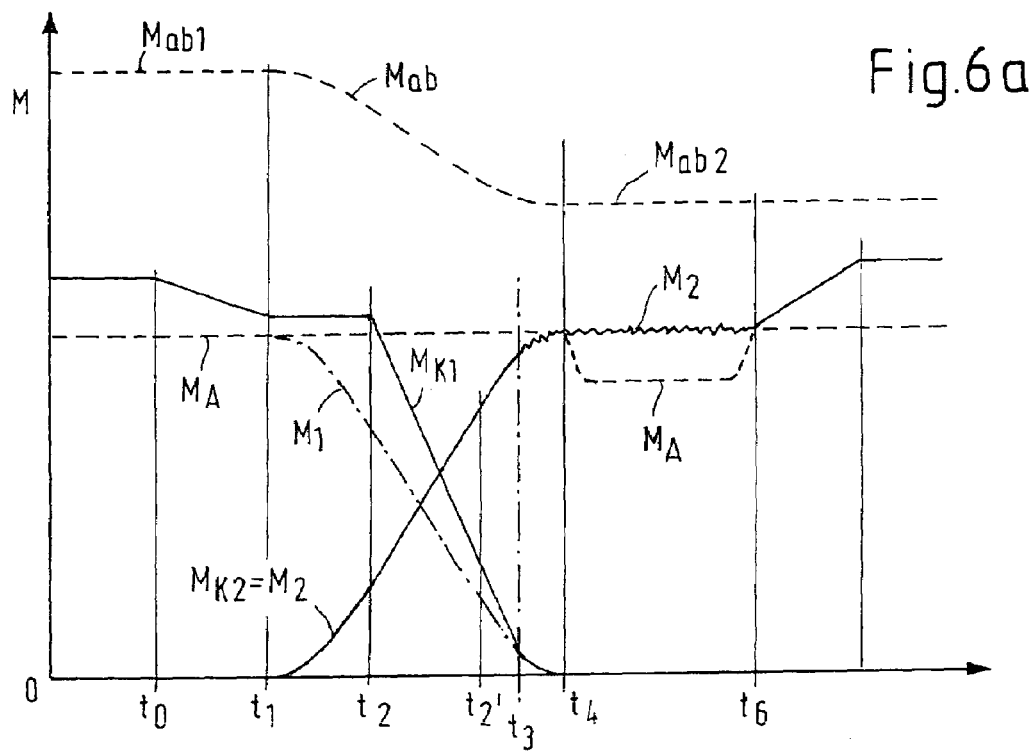
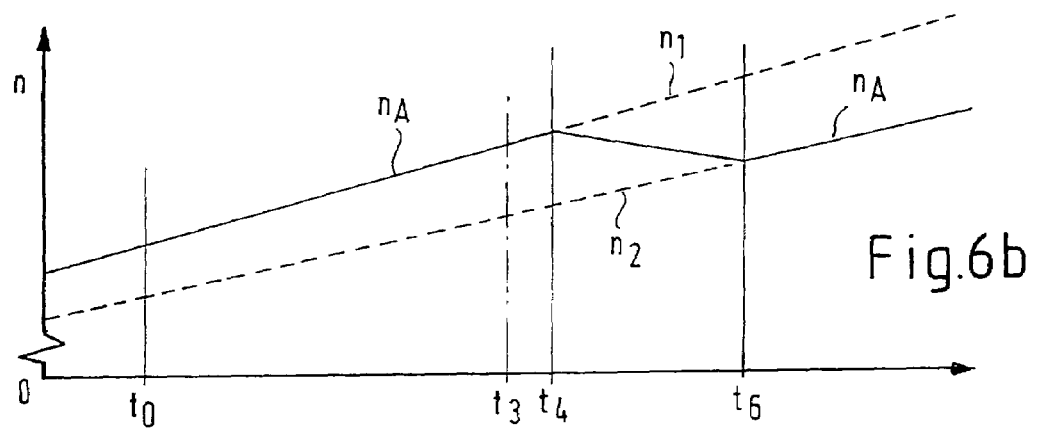
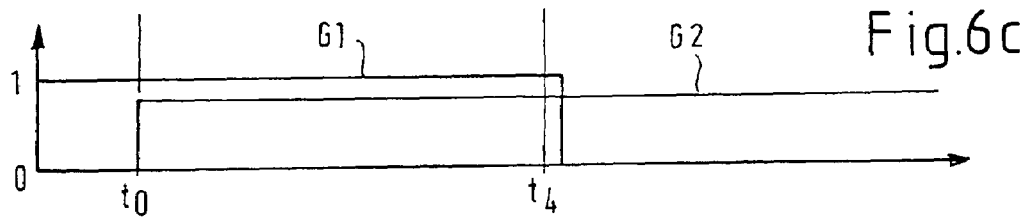

CONTROL METHOD FOR SHIFTING A POWERSHIFT TRANSMISSION

BACKGROUND OF THE INVENTION

The invention relates to a method for shifting two clutches of a transmission according to the preamble of claim 1. Such methods are used primarily for controlling clutches in automatic or automated transmissions in motor vehicles.

DE 101543722 discloses a method according to the preamble of claim 1 in which, with a chronological overlap, a power-receiving clutch which is assigned to the new gear speed is closed and a power-outputting clutch which is assigned to the old gear speed is opened, the clutches being embodied as slip-controlled wet clutches. The closing of the power-receiving clutch takes place approximately up to a working pressure which corresponds to the clutch capacity of the power-outputting clutch, the closing of the power-receiving clutch being preceded by filling with a filling pressure which is terminated with an end of filling. The method provides that, in a manually triggered power shift (traction upshift and overrun downshift), the filling of the power-receiving clutch with an increased filling pressure which corresponds to the order of magnitude of the clutch capacity of the power-outputting clutch unit is carried out in such a way that the end of filling is determined and that when the end of filling is detected the power-outputting clutch is opened with a chronological overlap and the clutch capacity of the power-receiving clutch is adapted.

A disadvantage of this method is that the power-outputting clutch cannot be opened until the end of filling has been detected, which leads to a high control complexity and control difficulties and to an unnecessarily long shifting period.

U.S. Pat. No. 4,527,678 discloses a shifting method according to the preamble of claim 1 for a double clutch transmission. The double clutch transmission has two transmission input shafts which can each be connected to the drive, an internal combustion engine, by means of a clutch, and which can be connected to a transmission output shaft by means of various gear speeds. The function of a mechanical freewheeling mechanism is provided by means of a suitable method of slip-based transfer of torque with subsequent engine speed adaptation phase in that the power-outputting clutch is moved into the slip region at the start of the transfer of torque, which can be detected from an increased engine speed or drive rotational speed.

In U.S. Pat. No. 6,385,520 a method is described for controlling the transfer of torque in automatic transmissions as a function of the rotational speed or transmission ratio, said method constituting a development of U.S. Pat. No. 4,527,678. Here, it is important, in particular at the end of the transfer of torque, i.e. when the power-receiving clutch has reached the level of the current engine torque, to set the torque of the power-outputting clutch to zero. If this is not suitable, the torque, which is available at the output, is reduced owing to a stressed state. If the transmission is installed in a motor vehicle, when there is slight stress the output torque or the acceleration of the vehicle will drop below the level of the connecting gear speed, which is evaluated by the driver as detrimental to comfort, whereas severe stressing of the transmission can cause the drive wheels to lock, which is not acceptable for reasons of safety.

DE19522834 discloses a method for overlapping shifting in automatic transmissions in which the overlapping time of the clutches is dependent on the load which is applied to the transmission. Furthermore, an optimum harmonic differential rotational speed is restored. The overlapping time of the clutches is adapted here to the requirements of the thermal capacity of the clutches involved and the actuating speeds of the electrohydraulic actuating system, and optimized. However, said method also exhibits two significant weak points of the previously proposed torque transfer methods. These are the necessary increase in rotational speed by permitting the slipping of the power-outputting clutch and the limitations when selecting the period of time for the transfer of torque.

Since drivers expect high levels of comfort especially from automatic transmissions and accordingly react in a sensitive way to an increase in the rotational speed of the engine, the magnitude of the slip which is set at the power-outputting clutch due to the method, as well as its rising gradient and falling gradient, must be kept very small and held at low dynamic values.

A further shifting method for a double clutch transmission having a plurality of gear speeds which are shifted by means of synchronizing gears is known from DE 196 31 983. Here, the torque zero crossover of the power-outputting clutch is detected by disengaging a modified synchronizing sleeve which is under tensile stress. Here, the sensitivity of the synchronizing gear which is configured with an undercut is not sufficient to bring about jolt-free decoupling of the power-outputting clutch, for example when there are relatively small torques such as usually occur in town traffic. Since a form-fit connection is broken with slight application of torque, the remaining residual torque of the outputting clutch is suddenly decreased and it will thus generate a jolt which the driver can feel or produce audible acoustic interactions.

Basically the previously published methods for transferring torque have attempted to ensure that the sum of the individual torques which are transmitted by the clutches corresponds, as a total, to the current engine torque. This is necessary since both clutches are to be held in the overrun state and this is also used as a basis for the rotational speed controller or transmission ratio controller. As a result, the processing of the shifting operation is wide in scope and requires a lot of time. The power-outputting clutch must firstly be moved into the overrun state, which takes some time, approximately 150 to 300 ms, which the driver feels is a disadvantage since the transmission does not shift spontaneously. This applies in particular to automatic transmissions and double clutch transmissions which drive with strategies in which a gear speed is already preselected. The processing of the shifting operation could start directly here but its start is delayed by the setting of the slip in advance.

Furthermore, it is disadvantageous that the sum of the individual torques which are transmitted by the clutches corresponds, as a total, to the current engine torque since when there are small faults in the torque which is set the engine speed which is transmitted through these torques reacts immediately by either rising below the current engine torque when the total torque is reduced, or dropping above the level of the engine torque when the total torque increases. Therefore, during the phase of the transfer of torque, the profile of the engine speed will very easily be subject to severe fluctuations since both clutches are operated in the slipping state and therefore react directly to very small changes.

Since, according to the invention, the rotational speed controller can detect the start of the transfer of torque only from a slight dip in the rotational speed—which also brings about a dip in the output torque—it is, on the one hand, complicated to make this transition stable during the matching process, and on the other hand it is easily possible for the driver to notice this dip in the torque and thus in the acceleration of the vehicle. Furthermore, this controller must react, or be matched, to different frictional relationships of the clutch and a different reaction behavior of the hydraulic system, a large number of different parameters such as temperature or power (high or low torque, gear speed, traction or overrun operating state) having to be taken into account. The matching which has to be carried out is therefore very time consuming and very large resources are required for this in the transmission controller. This problem is aggravated if the rotational speed differences which are to be set are very small. The control of the rotational speed must therefore be of a very high quality and be very rapid, which can be achieved only at great cost in the entire scope of the transmission.

Furthermore, the rotational speed controllers react to the different natural frequencies of the drive train, for which reason when matching the controllers for the rotational speed, slip or transmission ratio it is necessary to ensure that the corresponding frequencies are correspondingly damped. This in turn however restricts the control dynamics, for which reason a transfer of torque cannot be made as short as desired. The rotational speed controllers which are used for control have, by way of the principle, sensitivity to natural frequencies in the drive train. If, for example, due to a process in the drive train, there are already vibrations present, these are either not damped by rotational speed controllers or, in an unfavorable case, even amplified. For this reason, optimum matching can be carried out only with difficulty and it leads to less dynamic matching processes which in turn prolong the shifting time.

The same applies to suitable transitions when transferring the torque. In order to increase the comfort for the driver it is clear that jumps and bends in the shifting process are to be avoided since they lead to jolts and jerks. It is disadvantageous here to limit the dynamics of the underlying control process since suitable predefined torque profiles can only be followed inadequately and if the controllers cannot follow or if it is attempted to compensate for these faults by a corresponding increase in the amplification factors, the system tends to oscillate.

In contrast, when there are relatively long transfers of torque, the probability of the rotational speed controller hitting a corresponding frequency of the drive train, and then becoming unstable, that is to say oscillating, increases. This is due to the longer time period of the process which occurs, as a result of which the number of faults which occur rises, with the result that the probability of the occurrence of an instability also increases.

The fundamental control dynamics of the rotational speed controller limits the speed of the torque transition from the power-outputting clutch to the power-receiving clutch since the conditioning of the rotational speed signals and rotational speed gradients takes place only after a delay and also includes dead time components which cannot be appropriately resolved for all the known control concepts. A very rapid transfer of torque is thus not possible. This leads to a lengthening of the shifting time, which is undesired by the driver.

Furthermore, when matching the rotational speed controllers it is necessary to take into account the viscosity of the transmission oil which decreases with the temperature since this changes the dynamics of the controlled system. Different natural frequencies of the drive train are also present in different gear speeds, for example low natural frequencies around 2 Hz are present at low gear speeds, and relatively high natural frequencies around 8 to 10 Hz are present at high gear speeds. This makes it necessary to match the temperature, gear speed and type of shifting process with a correspondingly high degree of expenditure on sensor systems, control methods and control capacity.

An end of the torque transfer process can generally only be recognized from a dip in the rotational speed. This has the disadvantage of a further change in the acceleration, for example a jolt, which is possibly felt to be unpleasant by the driver. Furthermore, the precise time of the end of the transfer of torque can be detected only with difficulty since, during the matching process, it is necessary to find a suitable compromise between the detection of the termination and the occurrence of slight oscillations in the drive train which have nothing to do with the conclusion of the transfer of torque. The precise chronological sequence of the shifting process is, under certain circumstances, prolonged by this.

Since the methods are generally reliant on the detection of the end through the drop in the rotational speed, the torque profile is also defined by the rotational speed profile which is provided. Since this influences the gear transition into the subsequent rotational speed adaptation phase, in which the engine speed is adapted to the new transmission ratio, neither the rest of the profile of the rotational speed nor the subsequent torque profile can be freely selected.

The object of the invention is therefore to improve a method for shifting two clutches in such a way that the known disadvantages from the prior art are at least partially overcome, and in particular that the shifting comfort is increased and the shifting period and control complexity are reduced.

This object is achieved by means of the features of claim 1.

At least the first phase of the transfer of torque can be carried out by simple control of the two clutches by virtue of the fact that, during the transfer of torque, the power-receiving clutch increases torque capacity in the slip region and the power-outputting clutch decreases torque capacity, the power-outputting clutch having, in the initial phase of the transfer of torque, a higher torque capacity than is necessary to maintain its adhered state. As a result, complex control of the clutch capacities and complex sensing of rotational speed fluctuations etc., such as are known from the prior art processes, are unnecessary. The power-outputting clutch remains connected fixed in terms of rotation to the drive shaft of the engine, although the torque capacity of said clutch is reduced, while the power-receiving clutch increases its torque capacity under slip.

Since the power-outputting clutch is intentionally held in an above-capacity state over a wide range of the transfer of torque, only the slipping, power-receiving clutch determines the torque transition and thus the profile of the torque which is available at the output, and thus the acceleration of the vehicle. It is advantageous here that the engine speed cannot continue or drop and that the profile of the output torque or the acceleration profile of the vehicle is determined exclusively by the torque receiving clutch. Interference between the control circuits of the two clutches, which would affect the stability of the engine speed or the profile of the vehicle acceleration, does not occur here.

Preparation time is also not required for a shifting process and undesired rises in rotational speed do not occur during the preparation of the transfer of torque.

The shifting process can be started as soon as the power-receiving clutch is capable of receiving torque. Since the driver will then immediately sense a change in the acceleration of the vehicle, the shifting operations which are carried out with this method are felt to be spontaneous and quickly responsive. Furthermore, the method is insensitive to fluctuations in torque and/or imprecisions of the torque specifications of the engine since they are not used directly to control the transfer of torque, rather the transfer of torque is determined only by the rise in the torque component of the power-receiving clutch. Fluctuations in the clutch properties and, under certain circumstances, in the lubricant as a result of temperature, aging and wear are also thus compensated without difficulty.

The transition of the power-outputting clutch into the slip region can take place at any time during the transfer of torque as long as the transmission or the output shaft is not blocked. That is to say it is irrelevant how much of the drive torque is taken up by the power-receiving clutch, whether 10%, 50% or even 90%; the transition depends alone on the further demands the control system makes of the slip control of the two clutches.

In the first region of the transfer of torque, where the power-outputting clutch is still slipping, for this purpose this clutch is specifically operated with excess capacity. This means that the power-outputting clutch is kept in a securely closed state. For the first phase of the transfer of torque, this thus results in a sum of the transmittable torques of the clutches which is greater than the current torque which is fed into the system by the engine or drive. The sum of the torques which can be transmitted by the clutches is not reduced to, or slightly below, the level of the engine torque, thus causing the power-outputting clutch to slip, until in the last phase of the transition into the slip region of the power-outputting clutch.

The method can preferably be used for traction upshift and overrun downshift processes, but also as desired, i.e. independently of whether the drive is driving or braking and whether the rotational speed of the power-receiving clutch is higher or lower than that of the power-outputting clutch.

In this consideration it is insignificant whether the clutches are running with identical or different drive rotational speeds. Identical drive rotational speeds occur, for example, in a double clutch transmission which has a drive shaft and two concentric input shafts and two clutches which are arranged thereon. Different input rotational speeds occur, for example, when there are two clutches and/or braking belts of different wheel sets of an automatic transmission. In the latter case, when the torques are calculated, there is still the effect of the different drive rotational speeds to be taken into account, but said effect gives rise, if standardized to a uniform rotational speed, to the same profile of the rotational speed capacities as described in the previous paragraph.

The power-outputting clutch advantageously moves into the slip region if the slipping, power-receiving clutch transmits a considerable part of the drive torque. The slipping of the power-outputting clutch is preferably restricted to a very late time in the sequence of the transfer of torque, at which time the power-outputting clutch is already only transmitting a very small amount of torque, i.e. more than 50% of the drive torque. Errors which occur in the torque control can thus only have a very small effect since the power-receiving clutch has already taken over the main part of the torque. The probability of rotational speed harmonics and faults in the acceleration of the vehicle occurring is thus restricted to a very great degree. This increases the comfort and permits a simpler, and thus more reliable, embodiment of the control technology and of the control elements such as the transmission controller, electric and hydraulic actuator elements etc.

Imprecisions in the calculation of the engine torque also have no significant effect on the method. In the previously known methods, an incorrect engine torque easily gives rise to faulty actuations of the rotational speed controller, as a result of which rotational speed harmonics are possible due to spontaneous veering away of the clutch with correspondingly high rotational speed gradients at full engine torque at a given moment, but such harmonies are felt to be disruptive by a driver. These rotational speed harmonics cannot occur since the power-outputting clutch is in the adhering friction region, and the rotational speed of the input shaft of the power-outputting clutch thus continues to correspond to the engine speed for the majority of the time of the transfer of torque.

In a further embodiment of the invention, the period of the transfer of torque can be set as desired. Since the method is essentially controlled, it is not necessary to take account of complex control circuits but rather the control proceeds correspondingly slowly or quickly without the transfer of torque being in itself uncontrollable. As a result, allowance can be made for the shifting behavior or the comfort requirements of the driver and/or different operating states. If the driver intentionally wishes to drive in a sporty fashion or comfortable fashion, a correspondingly shorter or longer period is selected. When the torque capacity is low and/or at low drive rotational speeds, this time period can also be shorter, while, when the drive power levels are large and/or the drive rotational speeds are high the time period can be increased in order to ensure satisfactory control. This also applies to shifting processes at low or high gear speeds of the transmission, and the time period can also be adapted to different values here in accordance with the requirements.

Furthermore, the times at which the reduction in the torque capacity of the power-outputting clutch and the increase in the torque capacity of the power-receiving clutch start can be set as desired, it being possible for the times to be simultaneous or offset. Offset means that either the power-outputting clutch firstly reduces the torque capacity, but not below the adhesion limit, and the power-receiving clutch then increases the torque capacity. Or conversely, the power-receiving clutch first starts to increase the torque capacity and only then does the power-outputting clutch begin to reduce it. As a result, the shifting speed and/or shifting comfort can be increased, for example if two clutches of a different type are used, or if an open or closed clutch requires a run up time.

This measure also prevents problems occurring if, when initiating shifting processes in transmissions, it is necessary, for example, to adapt the pressure level of the supplying hydraulic system in order to be able to carry out the shifting process. The actuator elements can change their specific properties in the course of operation, but this does not have any influence on the shifting process for the time being. The functions which are used for control can even compensate deviations of the manipulated variables in the course of the shifting process, and even the displacements of the working points, which has to take place before the shifting process according to the prior art.

This applies in a similar way also to double clutch transmissions with dry friction plates or partial traction force supporting transmission concepts. Here, according to the prior art, actuator elements must often also be used for example by means of quick-acting lockup clutches at corresponding working points. Since these actuating processes cannot be carried out without jolting, the incipient slip control phase of the power-outputting clutch is disrupted. All this does not occur in the method according to the invention since these actuating processes are part of the transfer of torque itself. The entire shifting process can thus be carried out more quickly and reliably.

A further advantageous embodiment provides that the reduction of the torque capacity of the power-outputting clutch does not take place continuously during the transfer of torque. In particular, in the case of the power-outputting clutch, reductions can be carried out more quickly towards the end of the transfer of torque than at the start of the transfer of torque. This can be utilized so that, at the start of the transfer of torque, the power-outputting clutch is slowly adjusted to the point from which the torque capacity starts to drop slowly and then the torque capacity drops very severely to a value which is just above the current adhesion friction limit of the power-outputting clutch. As a result, the power-outputting clutch can be adjusted using simple control methods.

At the end of the transfer of torque by means of the power-outputting clutch, a slip controller which brings about automatic termination of the transfer of torque is advantageously produced. Alternatively, at the end of the transfer of torque by means of the power-receiving clutch it is possible to produce a slip controller which brings about an automatic termination of the transfer of torque. For a very short period, both clutches are then offset in the slip state, as a result of which the torque which has been transmitted by the clutches is unambiguously determined by virtue of the fact that the transmitted torques of the two slipping clutches are determined by means of the slip controller and the drive torque is thus adapted from the total torque of the clutches. In this region, the rotational speeds of the engine and transmission are advantageously kept approximately constant so that it is not necessary to take into account any power components from the acceleration or deceleration of rotational masses which are subject to inertia. A slight change in rotational speed can be accepted here since it is only of short duration and/or leads to the new input rotational speed.

The end of the transfer of torque is preferably determined by monitoring a clutch pressure which is set or a clutch position which is set. This data can be determined very easily and robustly so that sensors require little effort to configure and the acquired signals can be further processed using simple control methods.

The drive rotational speed is advantageously adapted to the rotational speed of the power-receiving clutch after the transition of the power-outputting clutch into the slip region. During each shifting process, the rotational speed of the drive shaft must also be adjusted from the rotational speed of the power-outputting clutch to the rotational speed of the power-receiving clutch, it being possible for this to be either an increase in rotational speed or a reduction in rotational speed, in the traction mode or in the overrun mode. The adaptation of the rotational speed is normally not carried out until the torque has been completely transferred to the power-receiving clutch. Owing to the late time of the slipping of the power-outputting clutch it is possible with this method for the drive rotational speed still to be changed directly to the rotational speed of the power-receiving clutch during the transfer of torque. As soon as the power-outputting clutch slips, the torque capacity of the power-receiving clutch is increased to the extent that the torque capacity of the power-outputting clutch and that of the power-receiving clutch are higher than the current drive torque. The shifting period is thus advantageously reduced overall, in particular owing to the shortened rotational speed adaptation phase.

As is customary, the drive rotational speed can be adapted to the rotational speed of the power-receiving clutch after the power-outputting clutch has been completely opened. The torque capacity of the power-receiving clutch is then set in such a way that the adaptation of the rotational speed takes place continuously.

The period of adaptation of the drive rotational speed can advantageously be set as desired. When the drive rotational speed is adapted, an oscillating or braking effect occurs at the output shaft, depending on the rotational speed ratio and whether the traction mode or overrun mode is present. However, this effect should be avoided if possible or at least kept as small as possible since the driver senses this as undesired jolting, i.e. a brief acceleration or braking. Since the duration of the adaptation becomes variable, the shifting behavior and the comfort requirements of the driver and/or different operating states can be allowed for. If the driver intentionally wishes to drive in a sporty or comfortable fashion, a correspondingly shorter or longer time period is selected. When the torque capacity is low and/or at low drive rotational speeds, this time period can also be shorter, while at high drive power levels and/or high drive rotational speeds the time period can be increased in order to ensure as far as possible jolt-free adaptation of the rotational speed. This also applies to shifting operations at low or high gear speeds of the transmission, and here too the time period can be adapted to different values in accordance with the requirements.

The drive torque is preferably briefly increased and/or reduced during the shifting process. As a result, the effect of the rise or fall in torque can be compensated owing to the adaptation of the torque with subsequent rise or fall in the torque, which is due to the adaptation of the rotational speed and leads to the jolting described above, by intentionally briefly increasing and/or reducing the drive power. As a result, the output torque profile at the output shaft becomes less unsteady, and at best continuous, during the entire shifting process. The additional drive torque or braking torque can be generated here by the engine itself and/or made available by assemblies which are also present and are connected to the drive shaft, such as for example electric motors, hydraulic pumps, starter-generators etc.

A gear speed which is connected to the power-outputting clutch is advantageously disengaged directly after the end of the transfer of torque so that, in the case of a fault during the transfer of torque, an undesired stressed state is avoided.

The inventive method may be used in a double clutch transmission with two transmission input shafts and one output shaft, each input shaft being assigned a clutch in the case of an automatic transmission and in the case of all other known transmissions in which a torque is to be transferred from one clutch to another clutch, as has already been partially described in DE 10153722.

The term "clutches" means all mechanical elements which can bring about a releasable frictional and/or non-positively locking connection between shafts are meant. These may be dry frictional clutches, wet frictional clutches such as multidisk clutches and/or brake belts of an automatic transmission. With this method, it is also particularly advantageous that two clutches of a different design can be controlled, for example a brake belt and a wet multidisk clutch of an automatic transmission. The build up of the torque capacity, i.e. the activation of the clutch, can be carried out here by means of hydraulic, mechanical, electrical or pneumatic actuator elements, or by means of other suitable actuator elements. Due to the design, it is also self-evident that each clutch can either be a power-outputting clutch or a power-receiving clutch, depending on which gear speed is being transmitted at a particular time and the gear speed into which shifting is to be performed.

Various objects and advantages of this invention will become apparent to those skilled in the art from the following detailed description of the preferred embodiment, when read in light of the accompanying drawings.

BRIEF DESCRIPTION OF THE DRAWINGS

FIGS. 6a to 6c shows a profile with a non-linear transfer of torque; and

DETAILED DESCRIPTION OF THE PREFERRED EMBODIMENT

Figure 1A:
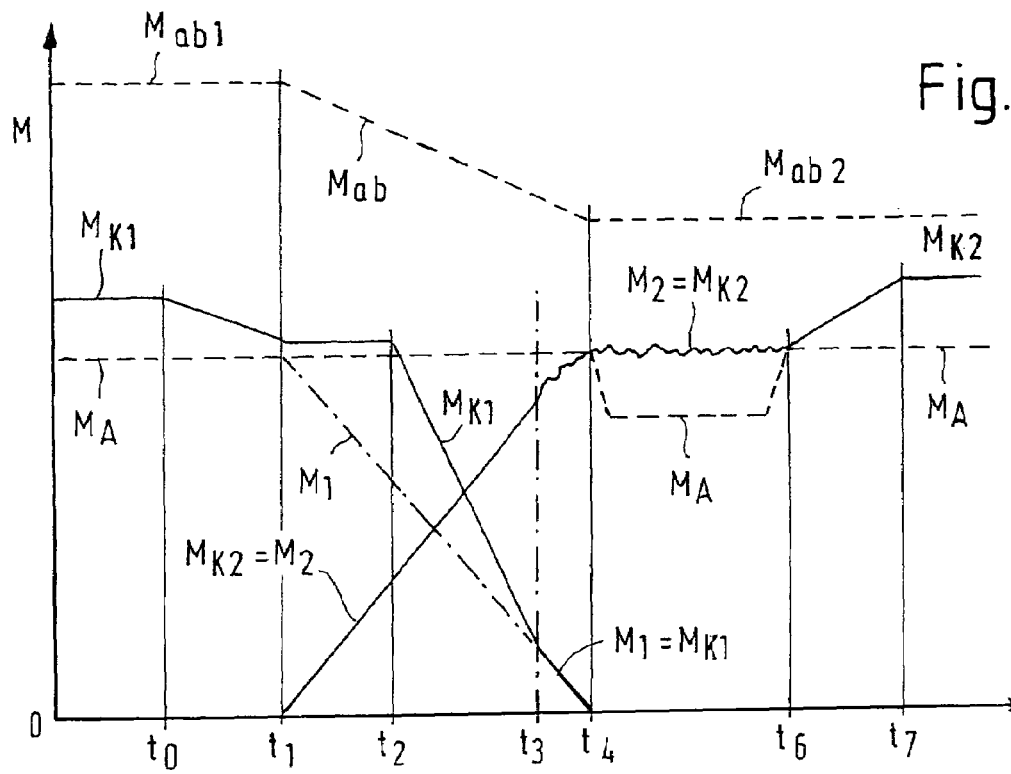
FIGS. 1a to 1c show a profile of the transfer of torque with slip control of the power-receiving clutch in the final phase.
Figure 1B:
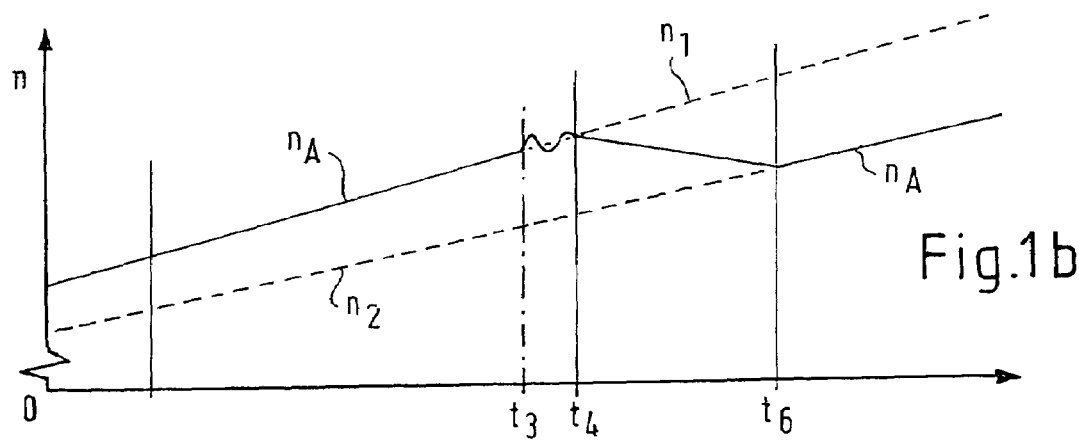
Figure 1C:
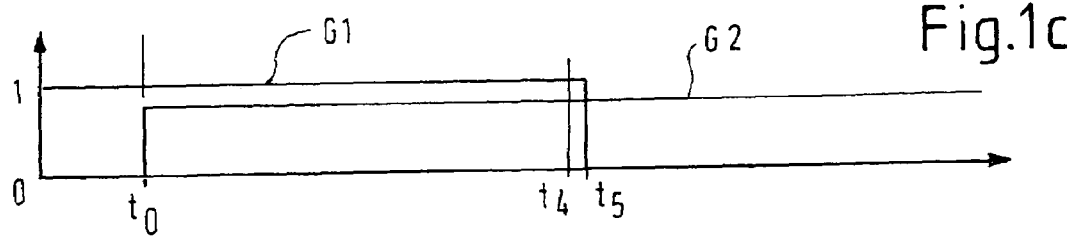

FIGS. 1a to 1c show a profile of the transfer of torque with slip control of the power-receiving clutch for a traction upshift, FIG. 1a showing the profile of the torques, FIG. 1b showing the profile of the rotational speeds, and FIG. 1c showing the shifted state of the gear speeds, which are connected to the power-outputting clutch and power-receiving clutch.

At the time t0, the shifting operation starts in that the torque capacity MK1 of the power-outputting clutch K1 is reduced to an absolute value which is slightly above the current drive torque MA so that the power-outputting clutch K1 reliably remains in the adhesion friction region; and gear speed G2 of the power-receiving clutch K2 is engaged. This process can also already be carried out a certain amount of time in advance of the actual transfer of torque, i.e. if it is apparent from the current driving situation that a shifting process is imminent. The output torque Mab 1 for driving a vehicle is available at the transmission output, Mab1 resulting from the drive torque MA and the transmission ratio of the currently selected gear speed G1 of the transmission.

At t1 the power-receiving clutch K2 starts to build up the torque capacity MK2, MK2 corresponding to the current torque M2 which is being transmitted by the clutch K2, since the power-outputting clutch K1 assumes the function of a freewheeling mechanism during the traction upshift owing to the rotational speed and power ratios between the two clutches K1 and K2. The current transmitted torque M1 of the power-outputting clutch is then determined from the drive torque MA minus the currently transmitted torque M2. As a result of the increasing torque M2 of the power-receiving clutch, the resulting output torque Mab, which is available at the transmission output to drive a vehicle drops in accordance with the rise of M2, the profile of the output torque not being directed to zero but rather approximately to the value of the output torque Mab2 which results owing to the freshly selected gear speed G2, completely opened power-outputting clutch K1 and completely closed power-receiving clutch K2. Starting from the time t2, the torque capacity MK1 of the power-outputting clutch K1 is reduced continuously, the clutch remaining in the adhesion friction region, i.e. the torque capacity MK1 continues to be greater than its currently transmitted torque M1. At t3, the torque capacity MK1 corresponds to the current torque M1, but starting from this point the power-outputting clutch goes into the slip region. Starting from t3, the sum of the torque capacities MK1 and MK2 of the two clutches is briefly less than the current drive torque MA, resulting in a brief increase in the drive rotational speed nA. When the increase in rotational speed is detected, the power-receiving clutch K2 shifts from the pure control to a slip control and a corresponding torque capacity MK2 is set, the drive rotational speed nA being used as a control variable. At the same time, the torque capacity MK1 is reduced further, at a somewhat reduced rate, to 0 at the time t4. As soon as the power-outputting clutch K1 no longer transmits any torque, the associated gear speed G1 is disengaged at t5, as close in time as possible to t4, see FIG. 1c.

The power-receiving clutch K2 is not slip controlled until the power-outputting clutch K1 goes into the slip region at t3, and in particular the rotational speed difference between the drive rotational speed nA and the rotational speed n1 of the power-outputting clutch K1 is used as the control variable. As soon as the power-outputting clutch K1 no longer transmits any torque M1 at t4, the region of the adaptation of the rotational speed by controlling the power-receiving clutch K2 starts, the drive rotational speed nA being reduced to the level of the rotational speed n2 of the power-receiving clutch K2 up to the time t6. So that there is no increase in the output torque Mab2 between t4 and t6 owing to the dynamic effects, the drive torque MA is briefly reduced between t4 and t6 by means of an intervention into the engine management system. As soon as rotational speeds of nA and n2 are made identical at t6, the torque capacity MK2 of the clutch K2 is increased to a value corresponding to the necessary safety interval above the current drive torque MA, and at t7 the entire shifting process is terminated.

Figure 2A:
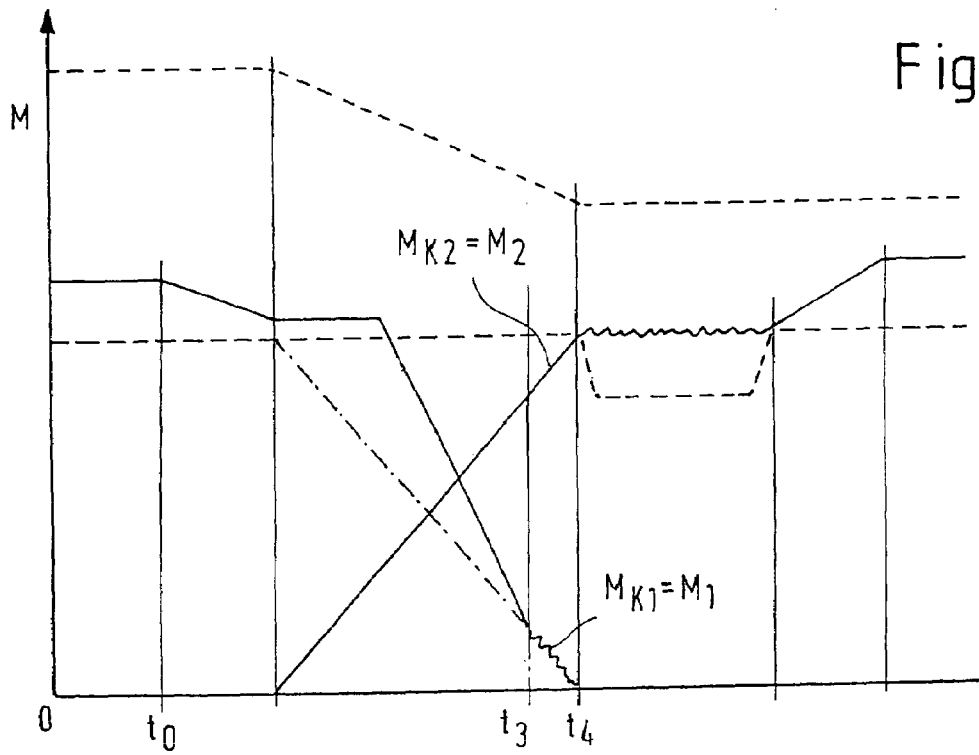
FIGS. 2a to 2c show a profile of the transfer of torque with slip control of the power-outputting clutch in the final phase.
Figure 2B:
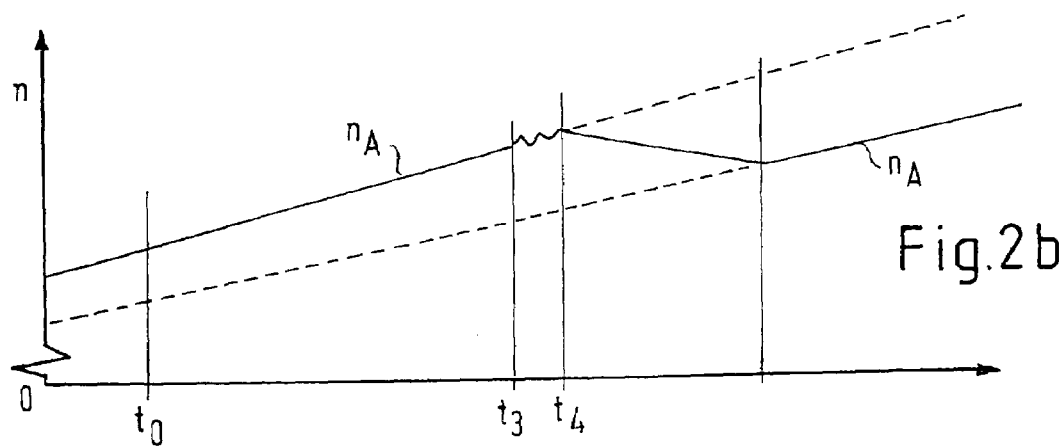
Figure 2C:
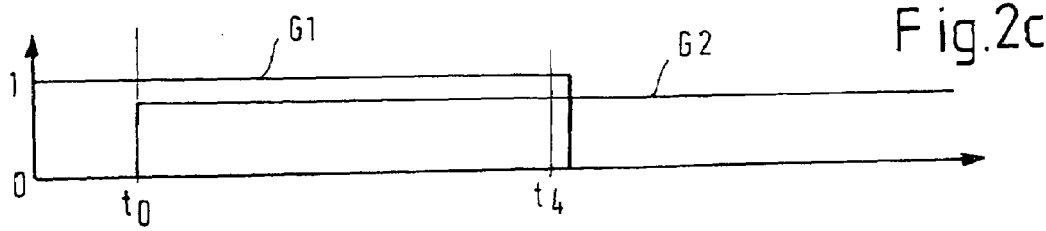

FIGS. 2a to 2c correspond essentially to FIGS. 1a to 1c. The only difference is that starting from t3 the torque capacity MK1 for the transition to the completely opened clutch K1 is slip controlled between t3 and t4 in the case of the power-outputting clutch K1, while the power-receiving clutch K2 continues to increase the torque capacity MK2 only in a controlled manner and with it the transmitted torque M2 up to the time t4 and does not change into the slip controlled state until starting from t4. This method has the advantage that the transition into the slip controlled region for the power-outputting clutch K1 can take place very quickly since the current transmitted torque M1 is still only small, that is to say only simple slip controllers are necessary. In contrast, the slip controller of the power-receiving clutch K2 can be prepared slowly, i.e. from the time t3 to t4, to receive the control function starting from t4. Overall, this procedure permits relatively simple slip controllers for both clutches to be installed.

Figure 3A:
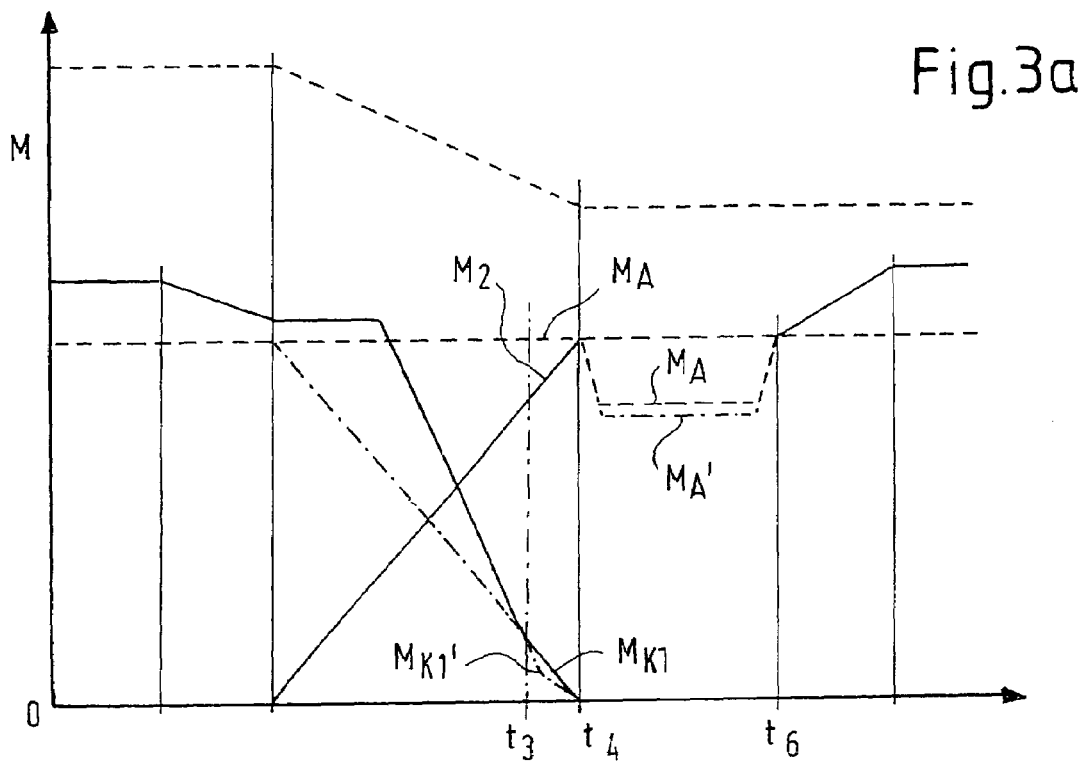
FIGS. 3a to 3c show the profile of the transfer of torque with slipping reduction of the capacity of the power-outputting clutch in the final phase.
Figure 3B:
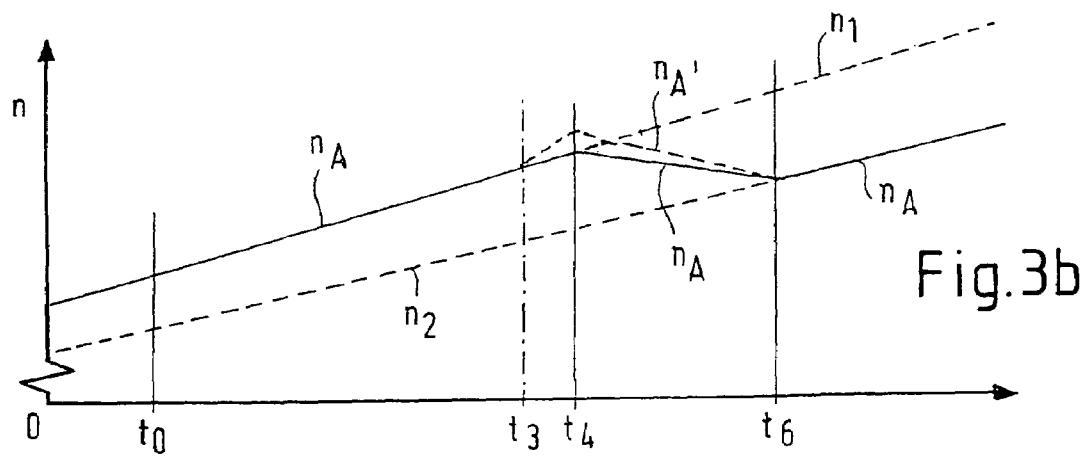
Figure 3C:
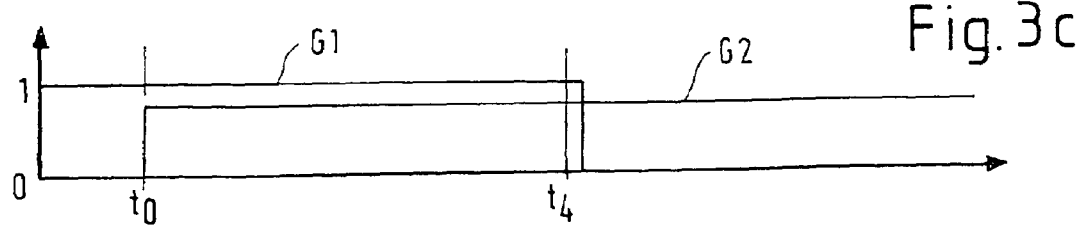

FIGS. 3a to 3c also correspond essentially to FIGS. 1a to 1c. However, here both the power-outputting clutch K1 and the power-receiving clutch K2 are controlled only starting from t3, i.e. both clutches slip, and there is a drive rotational speed nA between t3 and t4 which is dependent only on the current clutch state and on the corresponding control. Depending on the setting, nA remains at the level of the clutch rotational speed n1, or nA' increases (dashed representation). This is the case if the torque capacity MK1' falls below the required value which is necessary in order to maintain the drive torque MA with the torque capacity of the power-outputting clutch K2. In this case, the rotational speed nA' in the subsequent rotational speed adaptation phase must be reduced somewhat further to n2, between t4 and t6, by the power-receiving clutch K2 which is then slip controlled, the engine management system reducing the drive torque MA' somewhat further when necessary. An advantage of this embodiment of the method is, as in the embodiment above, that the slip controller of the power-receiving clutch K2 gains some time, between t3 and t4, to adjust itself while the power-outputting clutch K1 is not slip controlled during this process so that the slip controllers for both clutches can be embodied overall in a simpler way.

Figure 4A:
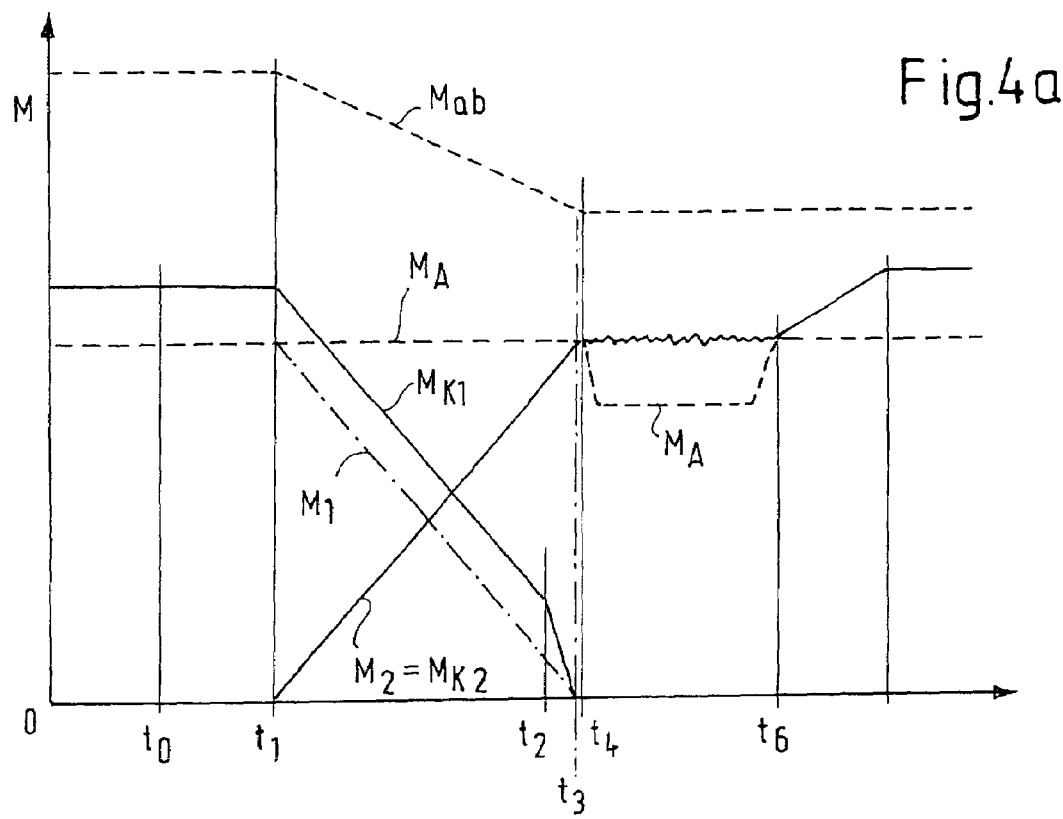
FIGS. 4a to 4c show a profile of the transfer of torque with a severe reduction in capacity of the power-outputting clutch in the final phase.
Figure 4B:
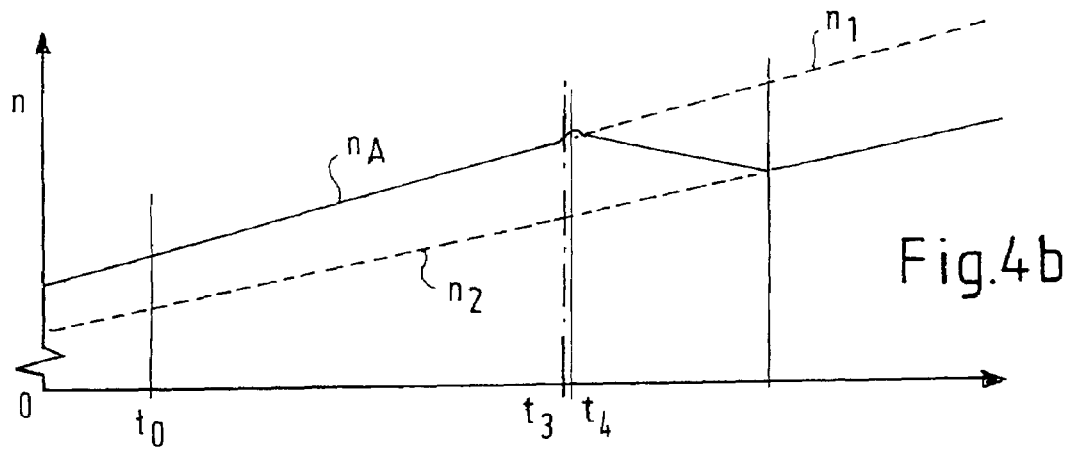
Figure 4C:
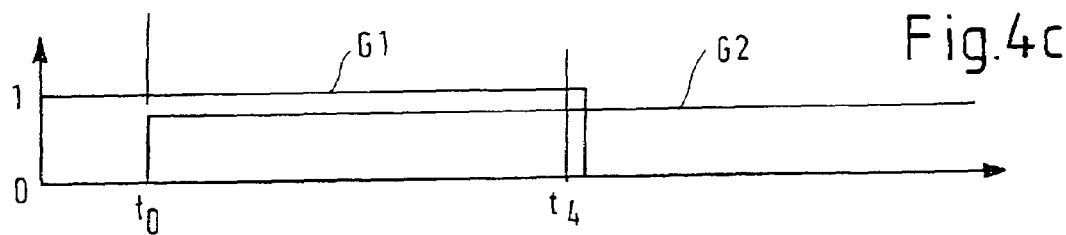

A further variant of the control method similar to that in FIGS. 1a to 1c is illustrated in FIGS. 4a to 4c. Here it is shown how, starting from t1, the torque capacity MK2 which corresponds to the current transmitted torque M2, of the slipping power-receiving clutch K2 is increased, and the torque capacity of the power-outputting clutch K1, which is in the adhesion region, is reduced by the corresponding amount. At the time t3, the torque capacity MK1 of the power-outputting clutch is reduced more quickly than before, specifically in such a way that the power-outputting clutch starts to slip, approximately at the time t3. Here, the time t3 is to be selected in such a way that it is only just before the time t4, i.e. the time at which the entire drive torque MA is taken up by the power-receiving clutch K2.

Figure 5A:
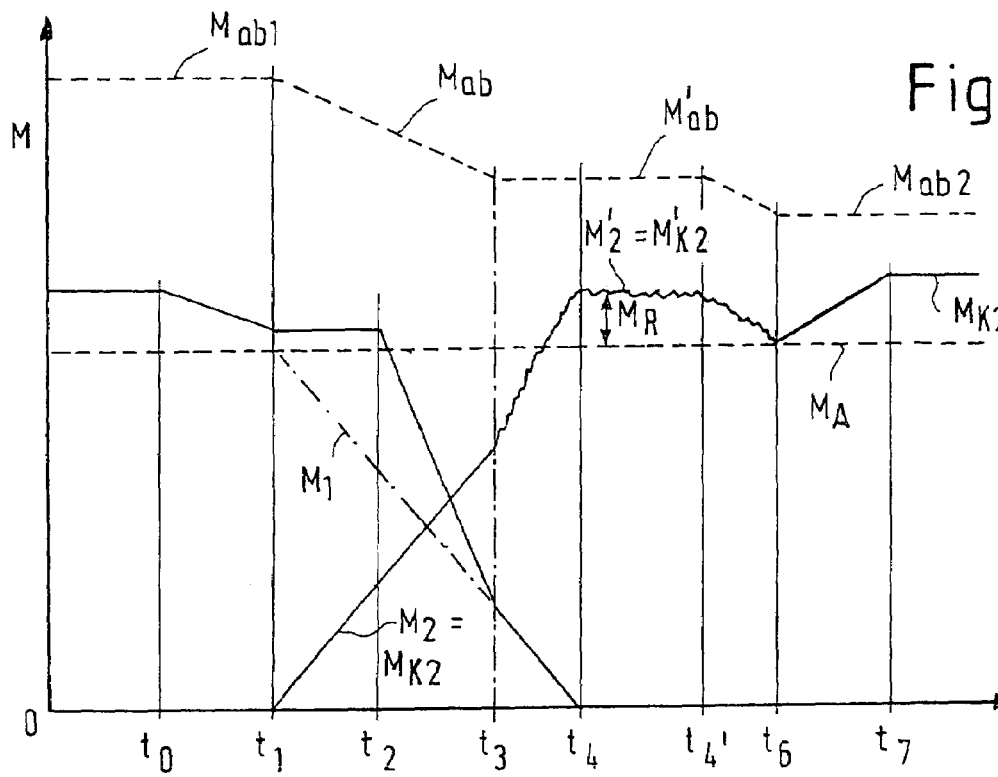
FIGS. 5a to 5c show a profile of the transfer of torque with an overlapping rotational speed of adaptation phase.
Figure 5B:
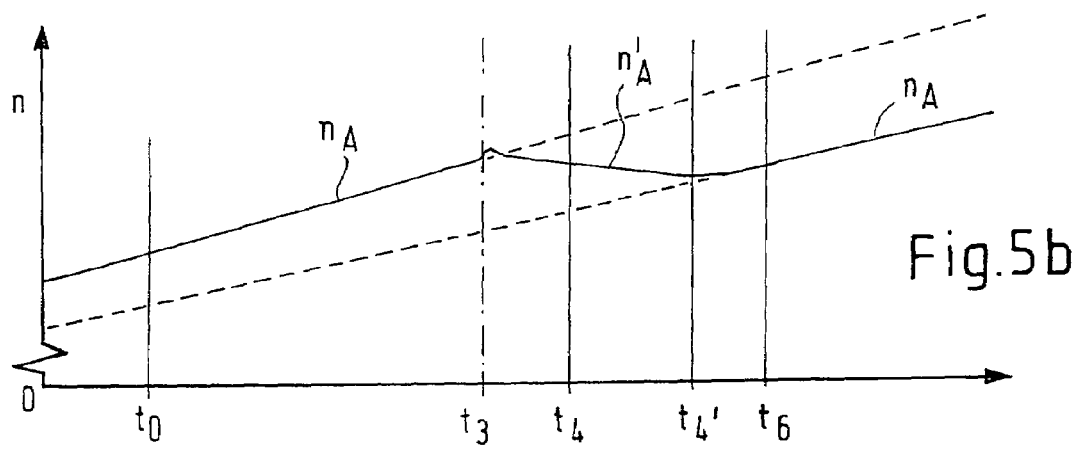
Figure 5C:
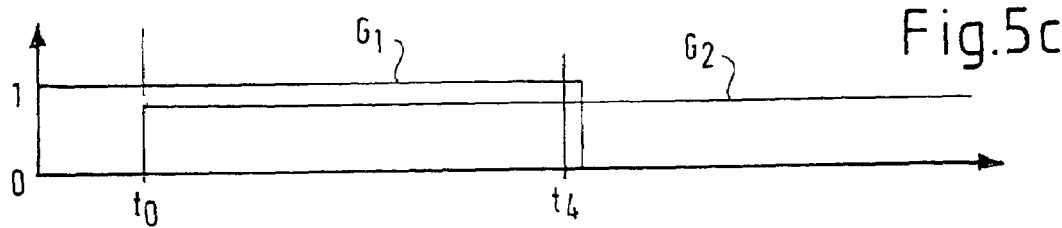

A further variant of the control method similar to that in FIGS. 1a to 1c is illustrated in FIGS. 5a to 5c, the adaptation of the rotational speed already taking place here during the transfer of torque. At t3, the torque capacity MK1 of the power-outputting clutch K1 has reached its torque M1 which is to be transmitted, and K1 starts to slip, while the torque capacity MK1 is reduced further to zero at t4. As a result of K1 slipping, the drive rotational speed nA is increased briefly after t3 and activates the slip control of the power-receiving clutch K2. The slip control is now carried out, however, in such a way that the torque capacity MK2 of the power-receiving clutch K2 is greater than the capacity which would be necessary in order to take up the drive torque MA together with the torque capacity MK1 of the power-outputting clutch K1.

This leads to a slight stress in the transmission. Since the drive torque MA is not affected by these processes, i.e. in this variant there is no need for intervention in the engine control, the drive torque which is required for the stressing process is acquired from the rotational energy of the drive, which results in a drop in the rotational speed of the drive during the stressing process. The suitable computation of the torque capacity MK2 of the power-receiving clutch K2 also brings about a situation in which, starting from t3, the output torque $M^1ab$ which is available remains constantly at one value. This means that the drop in rotational speed of the drive is used both to make available the stressing energy and to support the output torque $M^1ab$ for some time.

As soon as the power-outputting clutch K1 is completely opened at t4, the stressed state of the transmission also ends and the power-receiving clutch K2 transmits the torque $M^12$, which to the entire drive torque MA plus a kinetic component MR from the rotational energy of the drive, which is dependent on the drop in rotational speed nA'. The drive torque $M^12$ and the drive torque capacity $M^1K2$ are preferably set here in such a way that the output torque $M^1ab$ has the same value during the rotational speed adaptation phase as previously in the stressed phase between t3 and t4.

At the time $t4^1$, before the current drive speed $n^1A$ has reached the rotational speed n2 of the power-receiving clutch K2, that is to say still in the rotational speed adaptation phase, the torque capacity $M^1K2$ of the power-receiving clutch is dropped continuously to the current drive torque MA. This results in the drop in the rotational speed $n^1A$ being slowed down and the drive torque $M^1ab$ dropping. This process is preferably controlled in such a way that at the time t6 the drive speed $n^1A$ corresponds to the rotational speed n2, and the output torque $M^1ab$ corresponds to the output torque Mab2, Mab2 being the output torque which results from the drive torque MA and the gear speed G2 which is connected to the power-receiving clutch K2. As soon as the rotational speeds nA and n2 are identical at t6, the torque capacity MK2 is increased again to a value above the current drive torque MA.

The theoretical identical embodiment of the control method to that in FIGS. 1a to 1c is illustrated in FIGS. 6a to 6c. The only difference is that at the start of the transfer of torque at t1 the power-receiving clutch K2 does not form the torque capacity MK2 in a linear fashion but only slowly and then increasingly quickly until, at a time t2' at which this speed decreases again. The transition of the resulting output torque Mab at the transfer of torque between t1 and t4 is therefore very gentle so that a higher shifting comfort can be sensed by the driver.

In theory any desired suitable profile for M2 between t1 and t4 is conceivable here depending on which reaction the driver expects or desires. It is thus conceivable to allow the torque M2 of the power-receiving clutch to increase very quickly for a sporty driving style, which in turn has a direct effect on a drop in the output torque in order to signal a very spontaneous shifting process to the driver.

In general terms, all the methods described above are not restricted, in terms of their embodiment, to the examples shown. In particular, the times of the shifting sequences can be selected and set as desired depending on the necessary shifting speed, transmitted torque, comfort requirements of the driver, etc. This also applies to the curve profiles shown for the rotational speeds and torques, some of which are only schematic. Here too, all the methods described can be appropriately combined with one another as desired.

Figure 7:
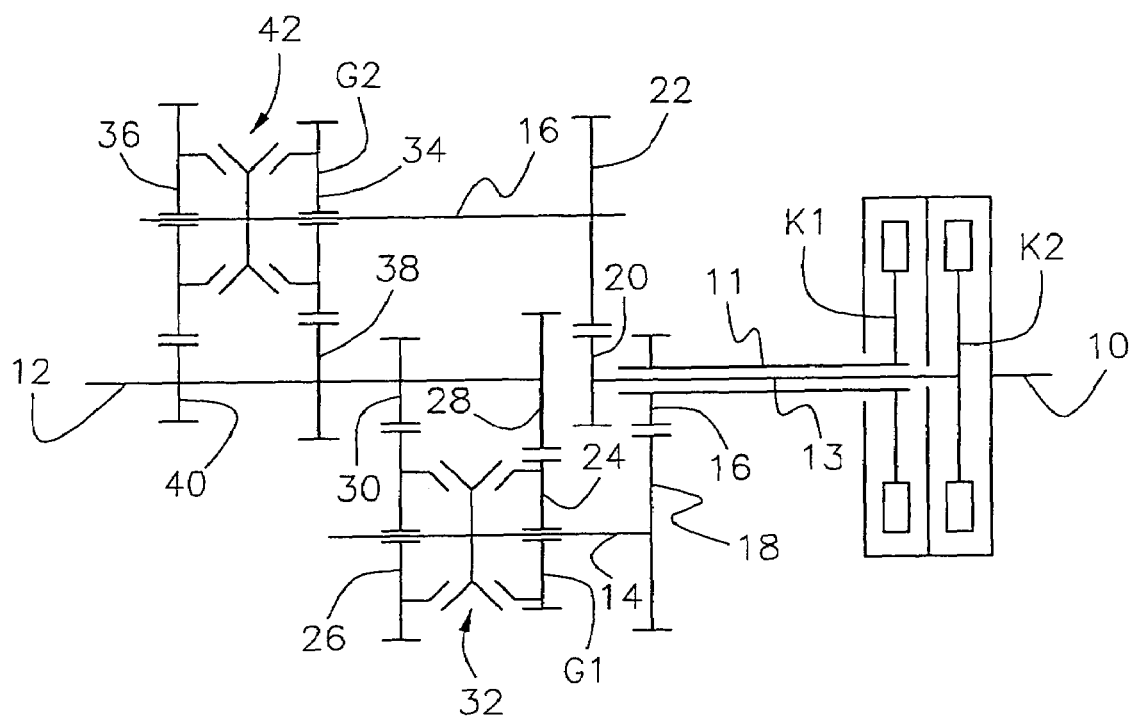
FIG. 7 is a schematic diagram of a powershift transmission to which the method of this invention can be applied.

Referring now to the drawings, there is illustrated in FIG. 7 an automated gear transmission 10 according to the invention. The transmission 10, designed particularly as a dual-clutch transmission, includes two input shafts 11, 12 arranged essentially mutually concentrically, and an output shaft 13. The first input shaft 11 is a solid shaft. The second input shaft 12 is a hollow shaft. The first input shaft 11 is arranged, over a portion of its longitudinal extent, inside second input shaft 12, as illustrated in FIG. 1. The first input shaft 11 and second input shaft 12 are each driveably connected to an input, such as the crankshaft of an engine or another drive shaft (not shown), via a first clutch 14 and a second clutch 15, respectively. The first input shaft 11 is engageable with the output shaft 13 through at least one of first pairs of gear wheels 16, and the second input shaft 12 is engageable with the output shaft 13 through at least one of second pairs of gear wheels 17. The first output shaft 11 is engageable with the output shaft 13 via three pairs of gear wheels 16 for the first, third and fifth speeds, and the second input shaft 12 is engageable with the output shaft 13 via three pairs of gear wheels 17 for the second, fourth and sixth speeds. In addition, the automated gear transmission 10 according to the invention includes a separate auxiliary shaft 18 to provide for reverse drive speed.

Referring again in particular to the illustration in FIG. 1 of the drawings, the transmission 10 transmits torque to the auxiliary shaft 18. A gear wheel 19, provided on the separate auxiliary shaft 18 for implementing reverse drive, is engageable with a gear wheel 20 on the second input shaft 12. Gear wheel 20 is a member of a second gear pair. A planetary gear set 21 is arranged on the auxiliary shaft 18 to reverse the direction of rotation for the reverse speed. The ring gear 22 of the planetary gear set 21 transmits torque to the output shaft 13 through its engagement with a gear wheel 23, which is mounted on the first input shaft 11. The reverse speed is engaged via a planet carrier 24 of the planetary gear set 21. Thus, the transmission 10 integrates the reverse speed such that all overlap of the individual speed-change gears is eliminated. Since the reverse gear wheel is in mesh only with the input shafts 11,12, this reverse gear wheel can be positioned around the input shafts 11, 12 at an angle of approximately 180°. Only a single shaft distance between the reverse gear and the input shaft co-determines the transmission ratio of the two reverse gear wheels, which preferably mesh with the fixed gear for the third and fourth speeds. This arrangement also has the particular advantage of reducing interdependencies among the gear ratio, shaft distance, and pitch circle radii.

The gear wheel 19 is secured to the auxiliary shaft 18 and is engaged with the gear wheel 20 on the second input shaft 12. Preferably, gear wheel 20 is the gear wheel for the fourth speed. Thus, the torque for moving the vehicle in reverse is transmitted via the fourth speed gear wheel on the second input shaft to the fixed reverse speed gear wheel 19 on the auxiliary shaft 18. Alternatively, the gear wheel 20 on the input shaft 12 is the gear wheel for the sixth speed. A reversal of the sense of rotation and the necessary gear ratio reduction are then achieved via the planetary gear set 21 on the auxiliary shaft 18.

FIG. 7 illustrates schematically a powershift transmission to which the method of this invention may be applied. The clutches K1 and K2 driveably connect the drive input 10 to a drive output 12 through and a multiple-speed gear arrangement having first and second countershafts 14, 16. When clutch K1 is engaged, it connects input 10 to countershaft 14 through shaft 11 and a meshing pinion 16 and gear 18. When clutch K2 is engaged, it connects input 10 to countershaft 16 though shaft 13 and a meshing pinion 20 and gear 22.

First-speed pinion 24 and third-speed pinion 26 are journalled on countershaft 14 and mesh, respectively, with gears 28, 30, which are secured to the output 12. A synchronizer 32 alternately connects pinions 24, 26 to countershaft 14.

Similarly, second-speed pinion 34 and fourth-speed pinion 36 are journalled on countershaft 16 and mesh, respectively, with gears 38, 40, which are secured to the output 12. A synchronizer 42 alternately connects pinions 34, 36 to countershaft 14.

The first gear G1 is produced when clutch K1 is engaged, clutch K2 is disengaged, and synchronizer 32 connects pinion 24 to countershaft 14. The second gear G2 is produced when clutch K1 is disengaged, clutch K2 is engaged, and synchronizer 42 connects pinion 34 to countershaft 14.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A method for transferring drive torque from a power-outputting clutch to a power-receiving clutch in a transmission having an input, an output and various gear speeds between the input and output, the method comprising the steps of:
transmitting torque through the power-outputting clutch while the power-receiving clutch is open;
increasing a magnitude of torque transmitted by the power-receiving clutch;
decreasing a torque capacity of the power-outputting clutch;
maintaining said torque capacity of the power-outputting clutch greater than the magnitude of torque transmitted by the power-outputting clutch during a first period of the torque transfer;
controlling slip across the power-receiving clutch during a second period in which the torque capacity of the power-outputting clutch is equal to or less than the torque magnitude transmitted by the power-outputting clutch;
increasing the magnitude of torque transmitted by the power-receiving clutch to a predetermined torque magnitude during the second period;
fully opening the power-outputting clutch; and
transmitting torque between the input and output through the power-receiving clutch.

2. The method of claim 1, wherein the power-receiving clutch transmits at least one-half of the drive torque when the power-outputting clutch enters the slip region.

3. The method of claim 1, wherein the steps of decreasing the torque capacity of the power-outputting clutch and increasing the torque capacity of the power-receiving clutch start at the same time.

4. The method of claim 1, wherein the step of decreasing the torque capacity of the power-outputting clutch starts before or after the step of increasing the torque capacity of the power-receiving clutch.

5. The method of claim 1, wherein the step of decreasing the torque capacity of the power-outputting clutch occurs at a nonlinear rate during a transfer of torque to the power-receiving clutch.

6. The method as claimed in claim 5, wherein the torque capacity of the power-outputting clutch is decreased more quickly during a period toward the end of a transfer of torque to the power-receiving clutch than during a period at a start of said transfer of torque.

7. The method of claim 1, further comprising:
terminating the transfer of torque to the power-receiving clutch when the power-outputting clutch is fully opened.

8. The method of claim 7, further comprising:
determining a total magnitude of torque transmitted by the power-receiving clutch and the power-outputting clutch; and
adjusting a magnitude of drive torque to said total torque magnitude.

9. The method of claim 1, wherein a power source is driveably connected to the power-outputting clutch and the power-receiving clutch, the method further comprising:
adapting a speed of the power source to a speed of the power-receiving clutch after the power-outputting clutch begins operating in the slip region.

10. The method of claim 1, wherein a power source is driveably connected to the power-outputting clutch and the power-receiving clutch, the method further comprising:
adapting a speed of the power source to a speed of the power-receiving clutch after fully opening the power-outputting clutch.

11. The method of claim 9, wherein a power source is driveably connected to the power-outputting clutch and the power-receiving clutch, the method further comprising:
adapting a speed of the power source to a speed of the power-receiving clutch during a period having a desired length.

12. The method of claim 10, wherein a power source is driveably connected to the power-outputting clutch and the power-receiving clutch, the method further comprising:

adapting a speed of the power source to a speed of the power-receiving clutch during a period having a desired length.

13. The method of claim 1, further comprising increasing the drive torque briefly during the torque transfer.

14. The method of claim 1, further comprising decreasing the drive torque briefly during the torque transfer.

15. The method of claim 1, further comprising:
disengaging a gear that is driveably connected to the power-outputting clutch after fully opening the power-outputting clutch.

16. The method of claim 1 wherein the step of increasing the torque capacity of, and magnitude of torque transmitted by the power-receiving clutch while the power-outputting clutch operates in the slip region further comprises:

increasing the torque capacity of the power-receiving clutch under slip control using a speed difference between a speed of the input and a speed of the power-outputting clutch as a control variable.

* * * * *